United States Patent [19]
Ramsden

[11] Patent Number: 5,692,378
[45] Date of Patent: *Dec. 2, 1997

[54] TURBOCHARGER ASSEMBLY

[75] Inventor: John Nigel Ramsden, Suffolk, United Kingdom

[73] Assignee: GFC Alsthom Diesels Limited, United Kingdom

[*] Notice: The term of this patent shall not extend beyond the expiration date of Pat. No. 5,619,854.

[21] Appl. No.: 535,530

[22] Filed: Sep. 28, 1995

[30] Foreign Application Priority Data

Nov. 4, 1994 [GB] United Kingdom ............... 9422251

[51] Int. Cl.$^6$ ...................................... F02B 37/00
[52] U.S. Cl. ............................................... 60/612
[58] Field of Search ................................. 60/612

[56] References Cited

U.S. PATENT DOCUMENTS

| | | | |
|---|---|---|---|
| 4,344,289 | 8/1982 | Curiel et al. ............... | 60/612 |
| 4,400,945 | 8/1983 | Deutschmann et al. ........ | 60/612 |
| 4,428,192 | 1/1984 | Dinger et al. | |
| 4,638,634 | 1/1987 | McLean . | |
| 5,069,194 | 12/1991 | Deutschmann et al. . | |
| 5,109,674 | 5/1992 | Sudmanns ................... | 60/612 |
| 5,440,881 | 8/1995 | Sudmanns et al. ............ | 60/612 |
| 5,560,207 | 10/1996 | Ramsden et al. ............. | 60/612 |

FOREIGN PATENT DOCUMENTS

| | | |
|---|---|---|
| 0 492 272 A1 | 7/1992 | European Pat. Off. . |
| 1478761 | 4/1966 | France . |
| 594939 | 11/1947 | United Kingdom . |
| 2 069 593 | 8/1981 | United Kingdom . |
| 2 244 094 | 11/1991 | United Kingdom . |
| WO 90/01112 | 2/1990 | WIPO . |
| WO 93/24735 | 12/1993 | WIPO . |

OTHER PUBLICATIONS

*High Speed Variety*, Paxman's new high performing 12VP 185 boasts a genuinely versatile design, LSM Aug. 1993, pp. 53–54.

*Sequential Turbocharging of the MTU 1163 Engine*, P. Herring, The Institute of Marine Engineers, Mar. 1, 1988, pp. 3–10.

*Paxman's new high performing 12VP185 boasts a genuinely versatile design*, Engines, High speed variety, LSM, Aug. 1993, pp. 53–54.

Primary Examiner—Michael Koczo
Attorney, Agent, or Firm—Kirschstein, et al.

[57] ABSTRACT

A turbocharger assembly includes a housing containing a first turbocharger and second and third turbochargers disposed on opposite sides of the first turbocharger. The exhaust gas outlet of the turbine of the first turbocharger is connected to the inlets of the turbines of the second and third turbochargers in parallel. All turbochargers are substantially identical in size. A plurality of assemblies my be employed to turbocharge a diesel engine, the respective second compressors being connected in parallel and the respective third compressors being connected in parallel. The housing may be gas-light.

13 Claims, 7 Drawing Sheets

TURBOCHARGER ASSEMBLY

BACKGROUND OF THE INVENTION

This invention relates to a turbocharger assembly for an internal combustion engine.

The practice of supercharging internal combustion engines by means of turbochargers to improve their power output is well known.

For single-stage turbocharging it may be sufficient to use a single supercharger large enough to supply air to all cylinders. For larger engines, in particular those having two rows of cylinders, each row of cylinders may be provided with its own supercharger. An example of such an arrangement is disclosed in United Kingdom Patent GB437078.

The pressure ratio obtainable by a single stage turbocharger is somewhat limited, and for higher performance, multiple stage turbocharging has been employed, the required degree of compression being provided by disposing a high pressure turbocharger in series with a low pressure turbocharger. Exhaust gas from the engine first passes through the turbine of the high pressure turbocharger and then passes through the turbine of the low pressure turbocharger. Similarly, air at atmospheric pressure is first compressed in the low pressure compressor and is then further compressed in the high pressure compressor.

Where two-stage turbocharging is applied to large engines, the low pressure turbocharger may prove to be physically large. To overcome the problems associated with the use of a large low pressure turbocharger it is known to provide an arrangement comprising two sets of two-stage turbochargers in which each two-stage turbocharger comprises two low pressure turbochargers connected in parallel with each other, the parallel combination being coupled in series with a single high pressure turbocharger. An engine utilizing this arrangement is described in the publication LSM, August 1993, pages 53–54 "High Speed Variety—Paxman's new high performing 12 VP185 boasts a genuinely versatile design". This design allows all the turbochargers to be of the same size, thereby eliminating the height and bulk previously associated with low pressure turbochargers. In this prior art arrangement, two sets of 2-stage turbochargers are mounted in a single integrated unit tailored to the requirements of the engine for which they were designed. While this arrangement has proved to be satisfactory, it is not suitable for larger engines requiring a greater number of turbochargers or smaller engines requiring only one set of turbochargers.

SUMMARY OF THE INVENTION

The present invention arose while seeking to provide an improved turbocharger assembly which can be used singly or in multiples on a variety of different sized engines.

In accordance with the invention, a turbocharger assembly for a supercharged internal combustion engine, comprises first, second, and third turbochargers; the turbochargers being arranged such that the second and third turbochargers are disposed on opposite sides of the first turbocharger with the gas outlet of the turbine of the first turbocharger connected to the gas inlets of the turbines of the second and third turbochargers in parallel.

This arrangement allows a substantially symmetrical layout to be employed which minimizes the length of ducting required to couple the high pressure turbine outlet to the low pressure turbine inlets.

It is possible to employ a number of identical turbocharger modules, each constructed in accordance with the invention, on a single engine, the number of modules depending on the size of the engine; and a small engine requiring only a single module. The resulting uniformity of design between different engines can help economy of production and ease of servicing and provision of spares.

The turbochargers of the or each assembly or module may be substantially identical. This also leads to an economical arrangement both in terms of cost and in the number of different types of components required, both for initial construction and subsequent maintenance.

The or each assembly or module preferably includes an enclosure, such that the compressors are outside the enclosure and the turbines are inside the enclosure. This simplifies the problems associated with heat loss from the components through which hot exhaust gases pass. It also protects personnel from accidental contact with the hot components.

Where the design is such as to allow exhaust gas leakage from the turbines and/or the ducting associated therewith, the enclosure may advantageously serve to collect such leakage and channel it to an exhaust duct. Alternatively, the enclosure may be made gas tight so as to allow a back pressure build up inside it thereby preventing further leakage.

The compressors of the low-pressure turbochargers may be coupled in parallel to supply air to the compressor of the high-pressure turbocharger. This provides an arrangement which requires less height than an equivalent two-stage turbocharger in which a high pressure compressor is supplied with air by a single low-pressure compressor.

BRIEF DESCRIPTION OF THE DRAWINGS

Embodiments of the invention will now be described by way of example, with reference to the drawings, in which.

DETAILED DESCRIPTION OF THE PREFERRED EMBODIMENTS

Figure 1:
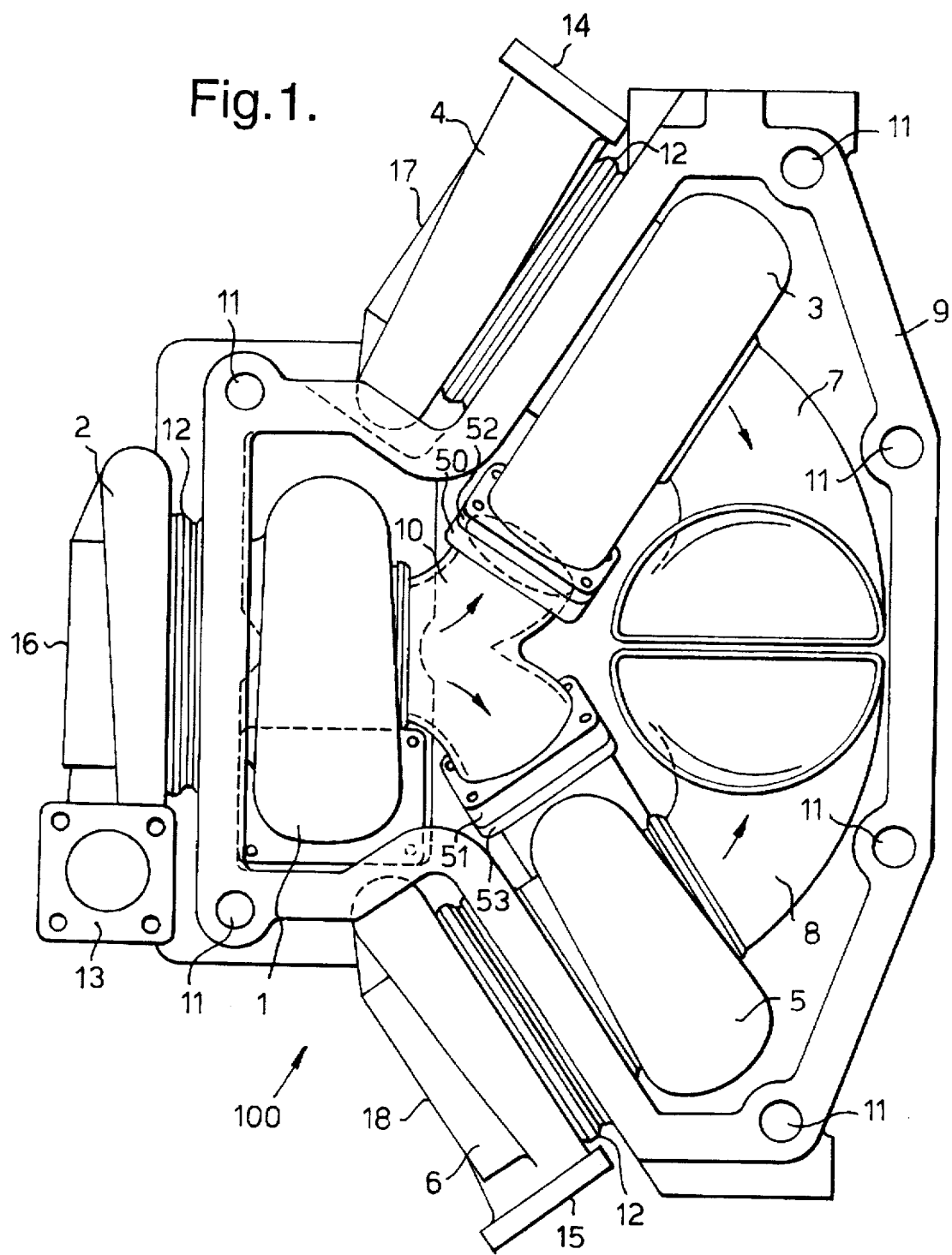
FIG. 1 shows a plan view of a turbocharger module in accordance with the invention.

Referring to FIG. 1, a turbocharger module 100 comprises three turbochargers. Each turbocharger comprises a turbine housing, a compressor housing, and a cartridge assembly comprising a turbine wheel and a compressor impeller mounted on a common shaft, and bearings for the shaft.

A first turbocharger comprises a turbine housing 1 and a compressor housing 2. A second turbocharger comprises a second turbine housing 3 and a second compressor housing 4. A third turbocharger comprises a third turbine housing 5 and a third compressor housing 6. The turbochargers are mounted on the walls of a supporting enclosure 9. The construction of the turbochargers and their mode of support will be described later with reference to FIGS. 6 to 8.

The gas outlet of the first turbine housing is connected to the gas inlets of the second and third turbine housings in common via a branch conduit 10. The joints between the branch conduit 10 and the low pressure turbine housings 3, 5 comprise respective laterally-sliding flanges 50, 51 mounted with a close-clearance on their respective turbine housing flanges 52, 53. The respective ends of the branches of the branch conduit are axially slidably mounted inside the sliding flanges with a close clearance. The gas outlets of the second and third turbine housings 3, 5 are coupled to respective trumpets 7,8 which direct the exhaust gas into an exhaust pipe, not shown. The first turbine housing 1 has a gas inlet arranged to receive exhaust gas at high pressure. The second and third turbochargers are symmetrically disposed on opposite sides of the first turbocharger. This arrangement provides a compact layout and allows the exhaust gas inlet pipe and the exhaust pipe to be disposed on a central axis.

The arrangement of one high pressure turbine in series with two low pressure turbines allows satisfactory performance to be obtained when a common design of cartridge is utilized for all three turbochargers. While acceptable performance may be attained by using a common design of turbine housing, it may be preferable for the first turbine housing 1 to be different from the second and third turbine housings 3, 5 in order to optimize efficiency.

The enclosure 9 has hollow walls to allow coolant to be passed therethrough. The enclosure has a lid, not shown in FIG. 1, which is likewise of hollow construction. Apertures 11 allow for passage of coolant between the enclosure and the lid. The input and output connections for passage of coolant have been omitted from the figures for clarity. The compressor housings 2, 4, 6 have respective air outlet ports 13, 14, 15 and respective air inlet ports 16, 17, 18. The compressor housings can be oriented at any desired angle with respect to the enclosure and are secured in position by tightening their respective V-band clamps 12.

Figure 2:
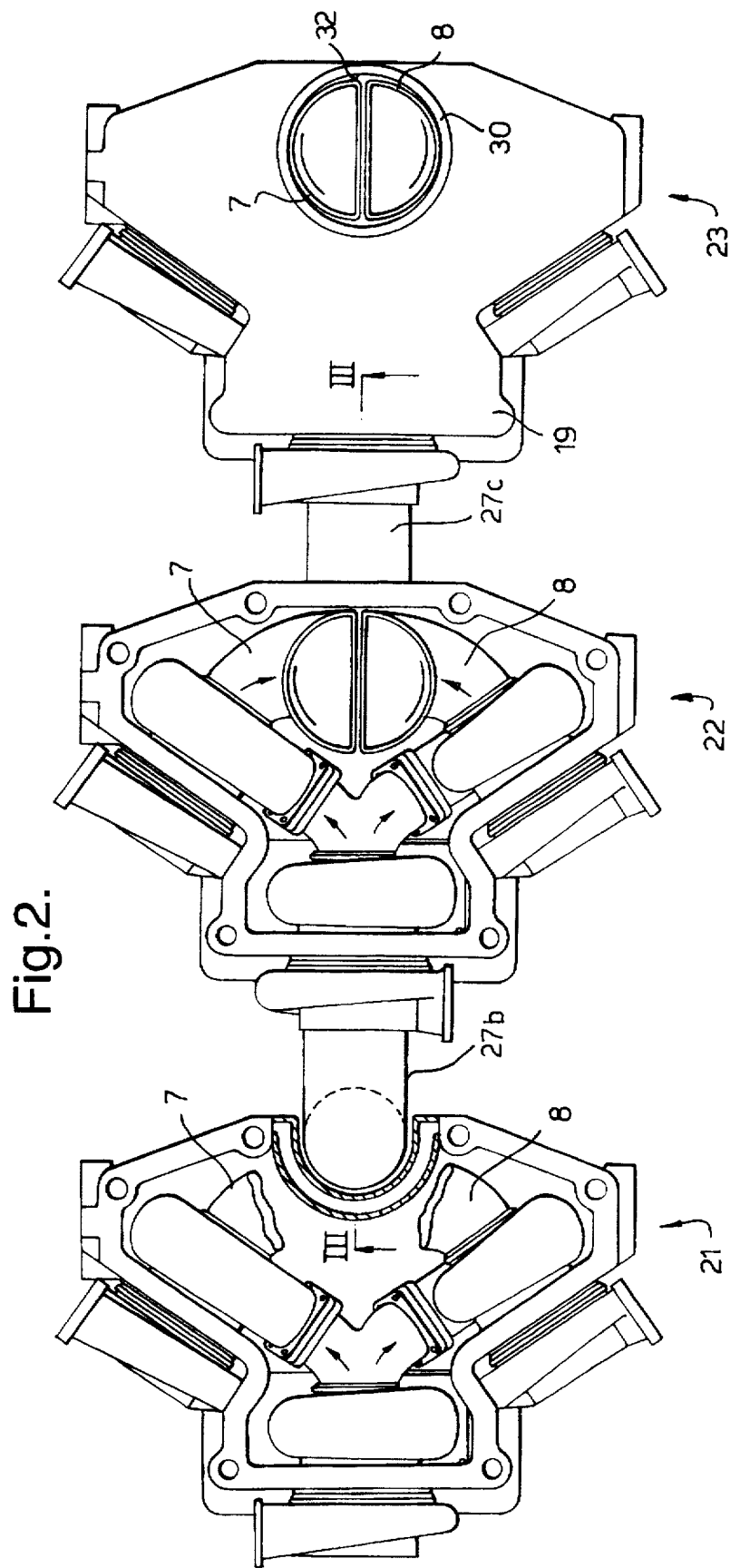
FIG. 2 shows a plan view of three turbocharger modules in accordance with the invention.
Figure 3:
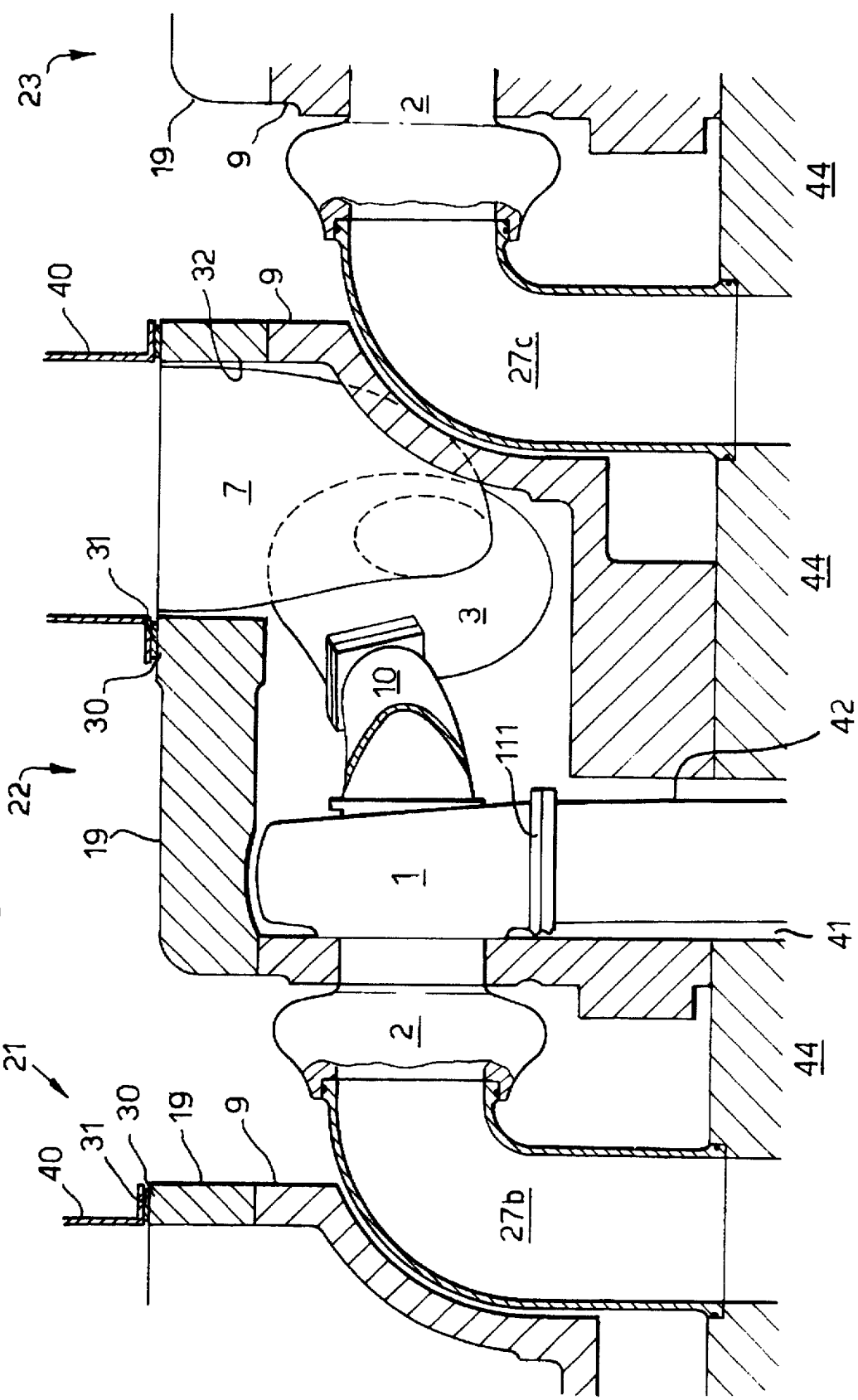
FIG. 3 shows a partly sectioned side view of FIG. 2.

In FIGS. 2 and 3 three turbocharger modules 21, 22, 23, each as shown in FIG. 1, are shown arranged in a line on an engine, for use as two-stage turbochargers.

In FIG. 2, module 23 is shown with its lid 19 in position. Module 21 is shown partly cut away to illustrate the recess provided to allow clearance for the intermediate pressure duct 27b, 27c associated with an adjacent turbocharger module. FIG. 3 is a sectional view of FIG. 2 along III—III with all lids in position.

Each lid 19 has a respective seating 30 to accommodate a respective exhaust pipe 40 and sealing gasket 31. The seating is disposed about an aperture aligned with the ends of trumpets 7, 8 such that a clearance exists between the trumpets and the wall 32 of the aperture.

The base of each box has a respective aperture 41 to accommodate a respective exhaust conduit 42 which brings exhaust gas from the exhaust manifold, not shown, of the engine to a respective input port 111 of each high pressure turbine housing 1. In the present embodiment, the exhaust manifold is jacketed to prevent escape of any exhaust gas which might leak from joints in the exhaust system to the immediate vicinity of the engine. The aperture 41 provides communication between the space enclosed by the jacket of the exhaust manifold, not shown, and the interior of the enclosure 9. The interior of enclosure 9 communicates with the interior of the exhaust pipe 40 via the clearance between the trumpets 7, 8 and the wall 32 referred to earlier. This arrangement allows any gas which may escape from joints in the exhaust ductwork to escape via the exhaust pipe.

Figure 4:
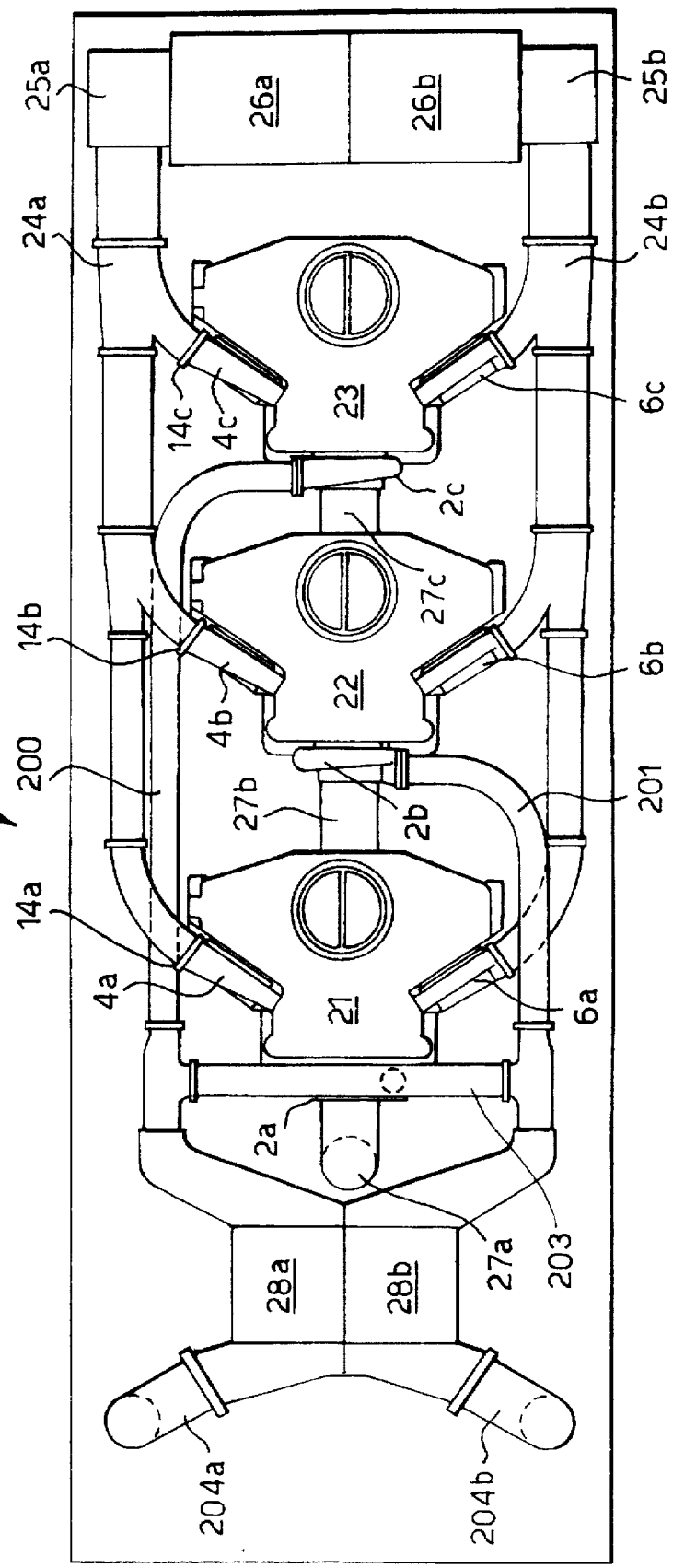
FIG. 4 shows a plan view of a first diesel engine in accordance with the invention.

FIG. 4 shows an arrangement in accordance with the invention as applied to an 18 cylinder engine 400. Only the turbocharger modules and their associated ductwork and coolers have been shown for clarity. The engine has three turbocharger modules 21, 22, 23 arranged in a line along the engine. The turbocharger modules are connected to function as two-stage turbochargers. The respective outlets 14a, 14b, 14c of each of the second compressors 4a, 4b, 4c are connected in parallel to a first intermediate pressure (I.P.) air inlet duct 24a. The respective outlets of each of the third compressors 6a, 6b, 6c are likewise connected in parallel to a second I.P. air inlet duct 24b. Air at atmospheric pressure is brought to the inputs of the respective second and third compressors via air filters and ductwork which has been omitted for clarity. The first and second I.P. inlet ducts 24a, 24b terminate at respective inlet ports 25a, 25b of intercoolers 26a, 26b. After being cooled, the cooled air at intermediate pressure passes along one or more I.P. outlet ducts, not shown. In the present embodiment the engine is of Vee block construction with two rows of cylinders, and this duct may be conveniently routed in the space between the rows of cylinders.

Branch pipes 27a, 27b, 27c convey air from the I.P. outlet duct to respective input ports of the respective first, high pressure, compressors 2a, 2b, 2c of turbocharger modules 21, 22, 23. The high pressure outlet of compressor 2c is connected to an input port of an aftercooler 28 via a first high pressure(HP) duct 200, the outlet of high pressure compressor 2b to a second input port of aftercooler 28 via a second HP duct 201, the outlet of high pressure compressor 2a is connected to the input ports of the aftercooler via a balancing pipe 203 which communicates with both HP ducts 200, 201. After being cooled, the air leaving the aftercooler 28 is supplied to the inlet manifolds of the engine, not shown, via respective high pressure air conduits 204a, 204b.

It can be seen that the configuration of the turbocharger module allows a particularly compact ductwork layout to be provided, whilst still allowing access to the individual turbocharger for overhaul and/or replacement.

In a modification, not shown, a single relatively large intercooler is used in place of the two separate relatively small intercoolers 26a, 26b.

Figure 5:
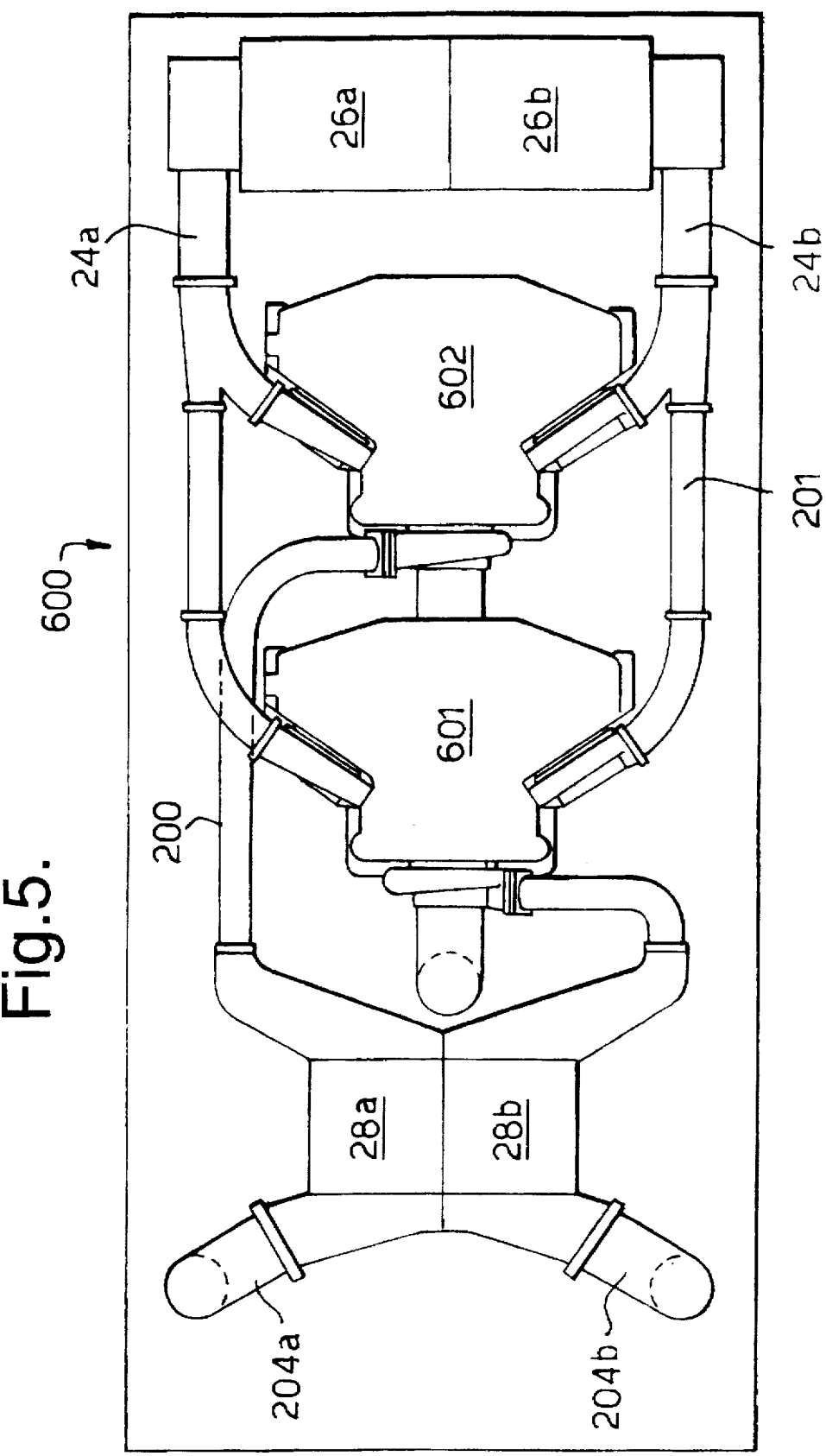
FIG. 5 shows a plan view of a second diesel engine in accordance with the invention.

FIG. 5 shows a 12 cylinder engine 600 in accordance with the invention. This embodiment uses two turbocharger modules 601, 602. The outputs of the second compressors are coupled in parallel to a first I.P. duct 24a, the outputs of the third compressors are coupled in parallel to a second I.P. duct 24b. The first and second IP inlet ducts 24a, 24b terminate at respective inputs 25a, 25b of the intercoolers 26a, 26b. The outputs of the high pressure compressors of module 602 and 601 are coupled via respective HP ducts 200, 201 to aftercoolers 28a, 28b.

In a modification, not shown, the aftercoolers 28a and 28b are combined into a single unit. In a further modification, not shown, the intercoolers 26a, 26b are similarly combined into a single unit.

Figure 6:
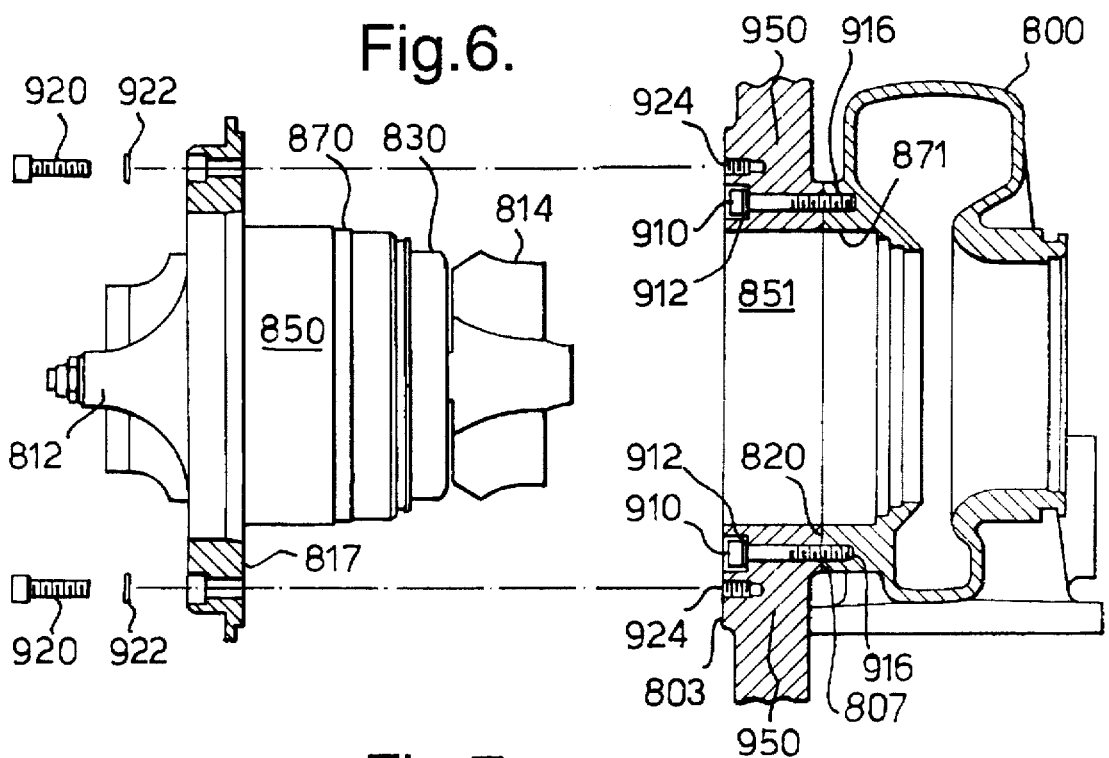
FIGS. 6 to 8 illustrate a turbocharger suitable for use with the invention.
Figure 7:
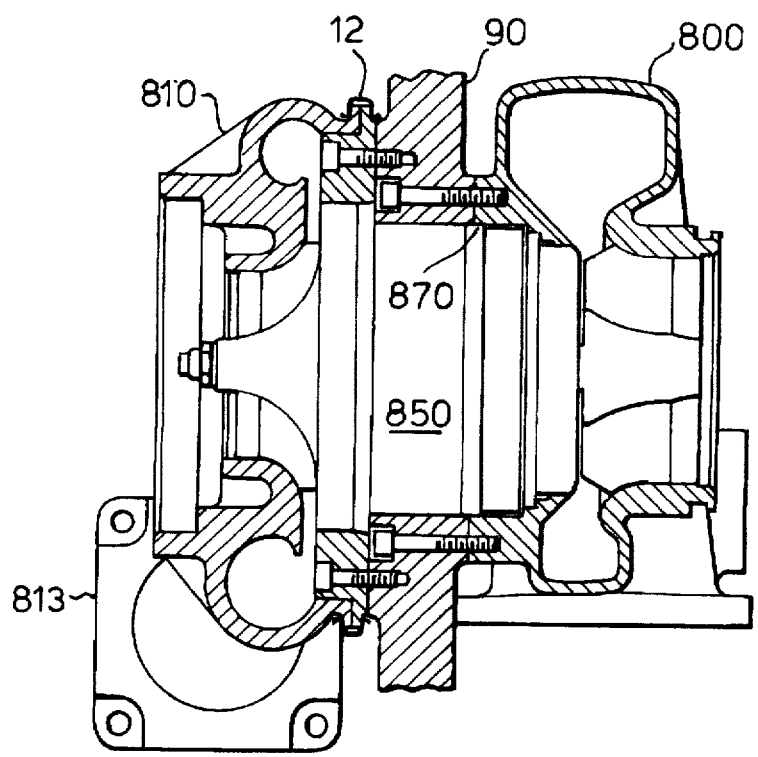
Figure 8:
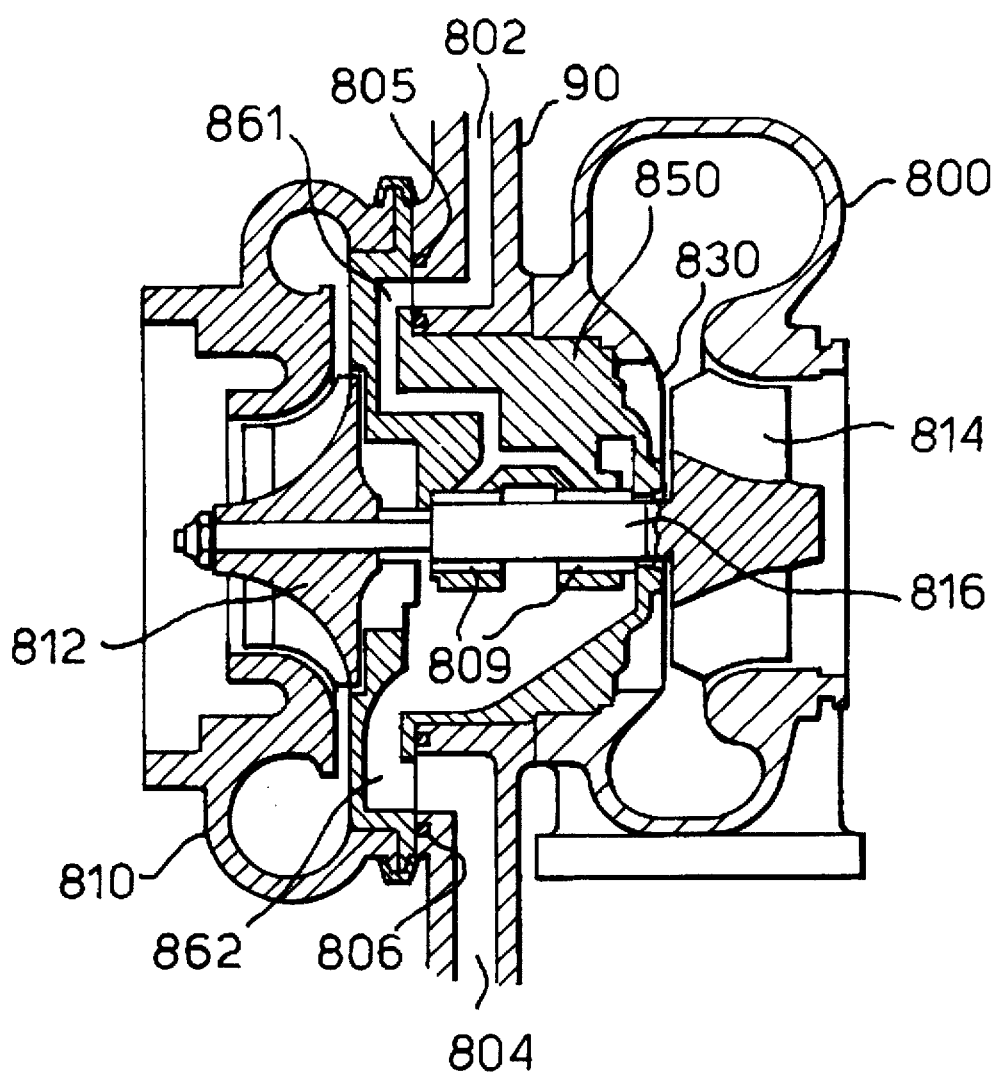

The construction of a turbocharger suitable for use with the invention will now be described with reference to FIGS. 6 to 8.

The turbocharger comprises four principal components. These are (a) a turbine housing 800;

(b) a compressor housing 810;

(c) a cartridge 850 comprising the moving parts of the turbocharger; and (d) an intermediate portion 950 of the wall 90 of the housing 9.

The cartridge 850 comprises a compressor impeller 812 and a turbine rotor 814 mounted on a common shaft 816 running in bearings 809. The cartridge 850 has oilways 861 adapted to supply lubricating oil to the bearings 809 and an oil drain duct 862 for oil emerging from the bearings 809. The oilways 861 and duct 862 terminate in an axial face 807 of the cartridge 850. A heat shield 830 shields the bearings from hot exhaust gases in the turbine in known manner. The housing wall 90 has an oil feed conduit 802 terminating at a first face 803 of the wall 90 and arranged to communicate with the oilway 861 in the cartridge 850 when the cartridge is assembled to the first face 803. The wall 90 also has an oil drain duct 804 terminating at the first face 803 and arranged to communicate with the oil drain duct 862. The housing has "O" ring oil seals 805, 806 adapted to seal the oilways and oil drain ducts.

To assemble the turbocharger, the turbine housing 800 is aligned with a bore 851 in a support region 950 of the wall 90 using an arbor (not shown) or by making registers in the wall and the turbine housing. The turbine housing 800 is secured in position with fasteners 910 engaging tapped holes 916 in the turbine casing 800, and washers 912. On tightening the fasteners 910, axial face 820 of turbine casing 800, is drawn tightly against a first face 807 of region 950. The faces 820 and 807 are machined to provide a gas-tight joint therebetween when the faces are drawn together. Next the cartridge 850 is inserted into the bore 851. The region 950 has a second face 803 adapted to engage with the axial face 817 of the cartridge 850. The thickness of the region 950 is such that, when face 807 engages face 803, the turbine rotor 814 is correctly disposed with respect to the turbine housing 800. The cartridge is held concentric with the turbine casing 800 by a spigot 870 having a close fit in a narrow circular register 871 in the turbine housing 800. The cartridge 850 is secured to the second face 803 by fasteners 920 and washers 922 which engage tapped holes 924 in the region 950. On tightening the fasteners 920, the "O" ring seals 805,806 are compressed to seal the oil feed and the oil drain connections.

Finally the compressor housing 810 is assembled to the cartridge 850 and secured in place by means of a Vee-section clamping ring 12. This allows the radial orientation of the housing 810 to be adjusted so as to bring the compressor outlet port 813 to any desired position. It will be seen that, on completion of the assembly, the region 950 becomes an integrated part of the turbocharger assembly, its thickness determining the alignment of the turbine rotor relative to the turbine housing.

It can be seen that, should a turbocharger become faulty in service, to replace the cartridge 850 carrying the moving parts it is only necessary to disconnect the air inlet duct (not shown) from the air inlet , the air outlet duct from the air outlet 803, remove clamp 12, pull off the compressor casing 810, release the fasteners 920 and withdraw the cartridge 850. A replacement cartridge can then be refitted in the manner described previously. It is not necessary to disturb the turbine housing 800 or the exhaust conduits coupled to the turbine inlet or outlet ports. Thus when, as in the embodiments described above, the turbine is mounted in a sealed enclosure, the integrity of the sealing of the enclosure is not broken. This affords simple and rapid turbine removal and replacement.

Attaching the turbine housing directly to the wall of the casing provides significant advantages in heat transfer, as much of the heat transferred from the exhaust gases to the turbine casing is diverted away from the bearings and flows directly to the wall whence it can be removed via the coolant therein. This avoids problems experienced by certain prior art turbochargers, wherein heat from the hot turbine housing flows via that portion of the turbocharger housing intermediate the turbine and the compressor to cooler regions and, should an engine have to be suddenly shut down and as a consequence, the oil pump providing forced lubrication (and cooling) of the turbocharger bearings ceases to operate, the high thermal gradient between the turbine casing (which can be at red heat) and the cooler regions can be such as to cause carbonization of the lubricating oil in the bearings.

In the turbocharger described above, the relatively narrow annular region where the spigot 870 mates with the register 871 is the only significant region where direct mechanical contact offering a low thermal resistance exists between the hot turbine casing 800 and the cartridge 850 containing the bearings. The air gap associated with the relatively loose fit between the other regions provides an increased thermal resistance to heat flow by conduction. Further, the direct connection between the turbine casing 800 and the wall 90, which, as noted may be hollow to accommodate coolant, is via mating surfaces 871 and 807 which have been machined to provide a good mechanical fit, and which therefore provide a low thermal resistance path to heat flow by conduction, which path shunts heat away from the bearings within cartridge 850.

The arrangements described above are given by way of example only, and a number of modifications are possible within the scope of the invention.

While the type of turbocharger described above is preferred, it is not essential, and any other suitable turbocharger may be employed.

A balancing pipe may be provided where there are an uneven number of turbocharger modules. Alternatively, the inlet casing to a single (rather than twin) aftercooler may be used as a mixing plenum. The compressor outlets may be connected to the air inlets of their associated change air coolers via individual conduits rather than by means of branches to a common conduit. Where a jacketed exhaust is employed, this need not communicate with the interior of the housing which supports the turbochargers. While it is advantageous in the interests of manufacturing economy for all turbochargers to be identical, it is not essential. It may be found that to obtain the highest efficiency, the high pressure turbocharger needs to be different from the low pressure turbochargers. However, the arrangement will still provide significant space advantages compared with arrangements utilizing a single low-pressure compressor to supply a single high pressure compressor. The enclosure need not be water-cooled.

The enclosure may be sealed, with no communication between the interior of the enclosure and the exhaust pipe. The back-pressure developed within the enclosure will tend to inhibit further leakage of exhaust gas.

The enclosure need not be sealed. The support need not be an enclosure if the turbocharger is used on an engine which is installed in a situation where ventilation is such that the removal of the heat radiated by the turbines and the dissipation of any leaking of exhaust gas is not a problem. In such situations the turbochargers may be supported by their exhaust gas inlet and/or outlet ports or the ductwork connected thereto or by support brackets in known manner.

The intermediate pressure air conduit may comprise two or more discrete conduits rather than a single conduit. A number of groups of intercoolers and/or aftercoolers may be provided, distributed about the engine so as to minimize the length of air ducts.

The second and third compressors of the or each module may be connected in parallel with each other. Such an arrangement is particularly suitable for smaller engines requiring only one turbocharger assembly, but may also be utilized where a plurality of turbocharger assemblies are employed.

I claim:

1. A turbocharger assembly for supercharging an internal combustion engine during engine operation, comprising:
   a) first, second and third turbochargers, each said turbocharger including a turbine and a compressor, each said turbine having a gas inlet and a gas outlet, each said compressor having an air inlet and an air outlet, said air inlet of said compressor and said gas outlet of said turbine of said first turbocharger lying on a central axis;
   b) means for arranging said second and third turbochargers to be disposed on opposite sides of a plane which is coincident with said central axis; and
   c) valveless conduit means for connecting said gas outlet of said turbine of said first turbocharger in parallel with, and in constantly open gaseous communication with, said gas inlets of said turbines of said second and third turbochargers throughout engine operation.

2. The turbocharger assembly as claimed in claim 1, wherein said first, second and third turbochargers are substantially identical in size.

3. The turbocharger assembly as claimed in claim 1; and further comprising an enclosure for supporting said turbochargers, each said compressor being located outside the enclosure, and each said turbine being located inside the enclosure.

4. The turbocharger assembly as claimed in claim 3, wherein said enclosure is operative for preventing exhaust gas leaking from each said turbine and said conduit means from passing exteriorly of said enclosure.

5. The turbocharger assembly as claimed in claim 3, wherein said enclosure has an aperture for allowing passage therethrough of exhaust gas from said turbines of said second and third turbochargers, and means for securing an exhaust pipe about said aperture in a gas-tight manner, and exhaust gas ductwork within the enclosure coupled to each said gas outlet of said turbines of said second and third turbochargers, said ductwork being arranged to direct exhaust gas from each said gas outlet of said turbines of said second and third turbochargers through said aperture into said exhaust pipe for allowing open communication between the interior of said enclosure and said exhaust pipe to enable exhaust gas leaking from each said turbine and said conduit means to escape via said exhaust pipe.

6. The turbocharger assembly as claimed in claim 4, wherein the enclosure is gas-tight; and further comprising means for allowing said leaked exhaust gas to build up a back pressure within the enclosure to inhibit further leakage of said leaked exhaust gas.

7. An internal combustion engine, comprising:
   at least one turbocharger assembly for supercharging the engine during engine operation, said assembly including
   a) first, second and third turbochargers, each said turbocharger including a turbine and a compressor, each said turbine having a gas inlet and a gas outlet, each said compressor having an air inlet and an air outlet, said air inlet of said compressor and said gas outlet of said turbine of said first turbocharger lying on a central axis;
   b) means for arranging said second and third turbochargers to be disposed on opposite sides of a plane coincident with said central axis; and
   c) valveless conduit means for connecting said gas outlet of said turbine of said first turbocharger in parallel with, and in constantly open gaseous communication with, said gas inlets of said turbines of said second and third turbochargers throughout engine operation.

8. The internal combustion engine as claimed in claim 7, wherein the air outlet of said compressor of said second turbocharger is coupled to the air inlet of said compressor of said first turbocharger.

9. The internal combustion engine as claimed in claim 7, wherein the air outlet of said compressor of said third turbocharger is coupled to the air inlet of said compressor of said first turbocharger.

10. The internal combustion engine as claimed in claim 7; and further comprising additional turbocharger assemblies; means for coupling the air outlets of a plurality of said compressors of said second turbochargers in common; and means for connecting the air outlets of a plurality of said compressors of said third turbochargers in common.

11. The internal combustion engine as claimed in claim 8; and further comprising additional turbocharger assemblies; and means for coupling the air outlet of the compressor of the first turbocharger of a first one of said turbocharger assemblies to a first high pressure air duct, and means for coupling the air outlet of the compressor of the first turbocharger of a second one of the turbocharger assemblies to a second air duct.

12. The internal combustion engine as claimed in claim 11; and further comprising means for coupling the air outlet of the compressor of the first turbocharger of a third one of the turbocharger assemblies to the first and second air ducts in common.

13. The internal combustion engine as claimed in claim 11; and further comprising a balancing duct coupled between the first and second air ducts.

* * * * *

UNITED STATES PATENT AND TRADEMARK OFFICE
CERTIFICATE OF CORRECTION

PATENT NO.   : 5,692,378
DATED        : December 2, 1997
INVENTOR(S)  : John Nigel RAMSDEN It is certified that error appears in the above-identified patent and that said Letters Patent is hereby corrected as shown below:

On the title page, please change the information pertaining to the assignee to the following:

Assignee: *GEC* Alsthom Diesels Limited, United Kingdom

Signed and Sealed this

Nineteenth Day of January, 1999

Attest:

*Acting Commissioner of Patents and Trademarks*

*Attesting Officer*